INVENTORS
ALLISON W. BLANSHINE
ROBERT E. WALLIN

BY

ATTORNEY

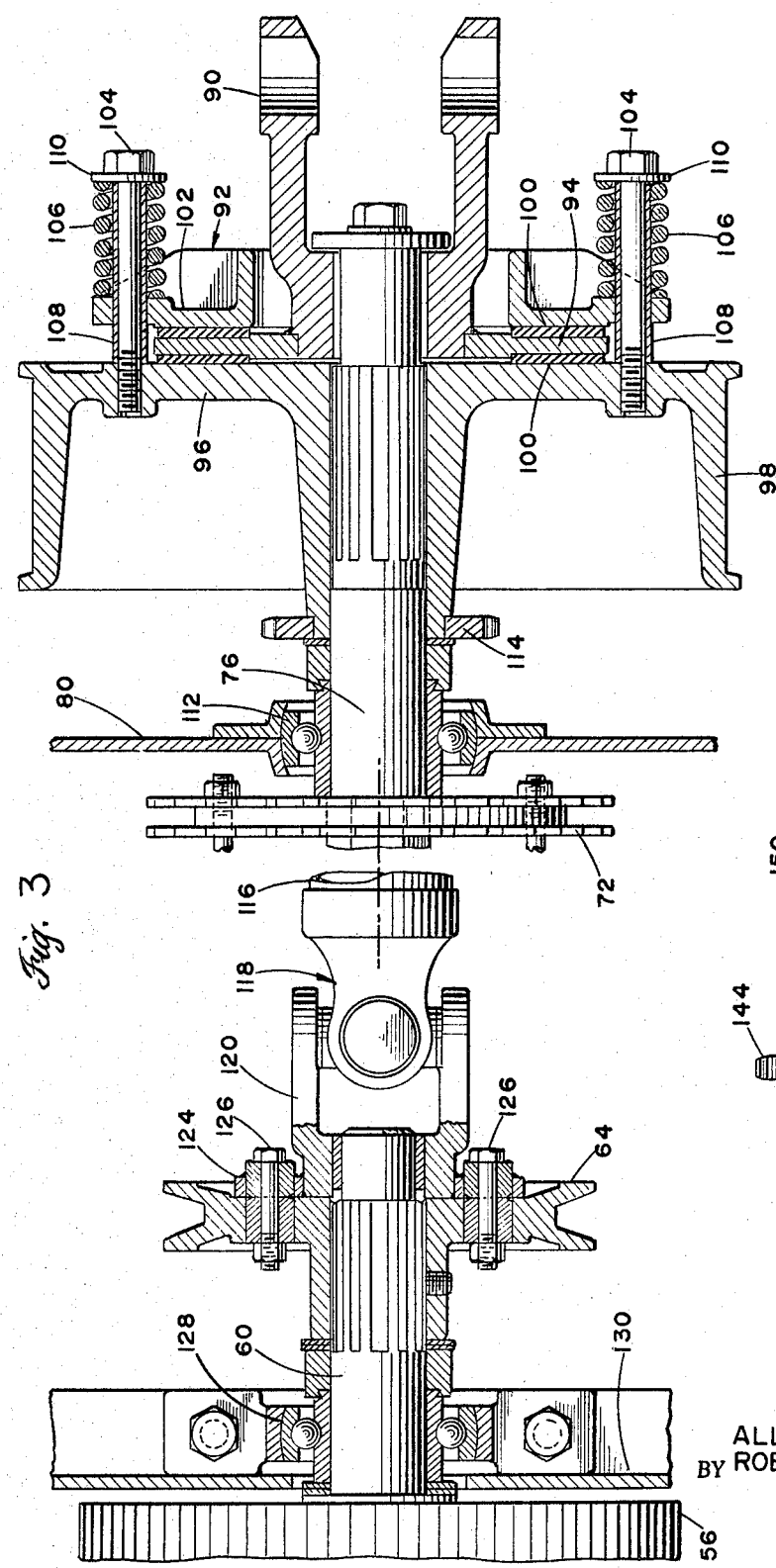

United States Patent Office 3,382,902
Patented May 14, 1968

3,382,902
DRIVE MEANS AND SAFETY PROVISIONS
Allison W. Blanshine, Lititz, and Robert E. Wallin, New Holland, Pa., assignors to Sperry Rand Corporation, New Holland, Pa., a corporation of Delaware
Filed Aug. 15, 1966, Ser. No. 572,427
5 Claims. (Cl. 146—71)

This invention pertains to a corn processing machine and, more particularly, to a drive means for various processing means and units incorporated in said machine, primarily to render the operation thereof safely fool-proof against damage to any of the processing means in the event of accidental jamming or stopping thereof due to overloads or the like.

The overall corn processing machine and especially the cooperating processing means and units thereof essentially comprise the subject matter of co-pending application, S.N. 546,280, filed Apr. 29, 1966, and owned by the same assignee as the instant invention.

As set forth in greater detail in said co-pending application, the overall corn processing machine and system employed therein provide interrelated means and units to treat ears of corn comprising the steps and functions of shelling and separating shelled kernels from the cobs, passing the kernels through cracking means, transmitting the barren cobs to chopping and shredding means by which the cobs are reduced to a predetermined degree of shredded sizes, moving the shredded cob material along conveyor means for intermixing of the cracked corn kernels substantially homogeneously therewith, and discharging the intermixed corn product thus formed to any of a number of destinations such as storage facilities, feed carts, or otherwise.

In said co-pending application, various refinement and modifications of the interrelated operations outlined hereinabove are set forth. Among the refinements, for example, there is described regulating mechanism by which only part of the cob material may be mixed with the cracked kernels if that is desired. Further, drive means for the various interrelated and cooperating units and means are described in said co-pending application for purposes of describing a completely operative processing machine as well as a method of processing ears of corn. The principal purpose of said co-pending application however is to describe and claim overall principles of said processing machine and method of processing ears of corn. Accordingly, certain aspects of the drive mechanism for the various cooperating means and units have only been described and claimed in sufficient detail in said co-pending application to render the operation of the machine and performance of the method comprehensible.

It is the principal object of the present invention to provide drive means, principally of a safety nature, for the various cooperating processing means and units of the aforementioned corn processing machine generally described and claimed in said co-pending application but which are described and claimed in greater detail hereinafter than in said co-pending application for purposes of directing attention primarily to the efficient and safe nature of such drive means.

It is another object of the invention to provide an arrangement of safety mechanisms in the aforementioned drive means which are so located with respect to the various processing means and unit that there is substantially no possibility of damage of any appreciable extent occurring to any of said processing means and units due to the strategic location of said safety means in the drive means.

Details of the invention and of the foregoing objects, as well as other objects thereof, are set forth in the following specification and illustrated in the accompanying drawings comprising a part thereof.

In the drawings:

FIG. 3 is an enlarged, fragmentary, horizontally sectioned view of certain principal elements of the drive means of the processing machine shown in FIGS. 1 and 2 and principally sectioned along the line 2—2 of FIG. 1.

FIG. 4 is a fragmentary enlarged side elevation of part of the drive mechanism shown in FIG. 1 and illustrating shear-type safety means partly illustrated in vertically sectioned manner.

Figure 1:
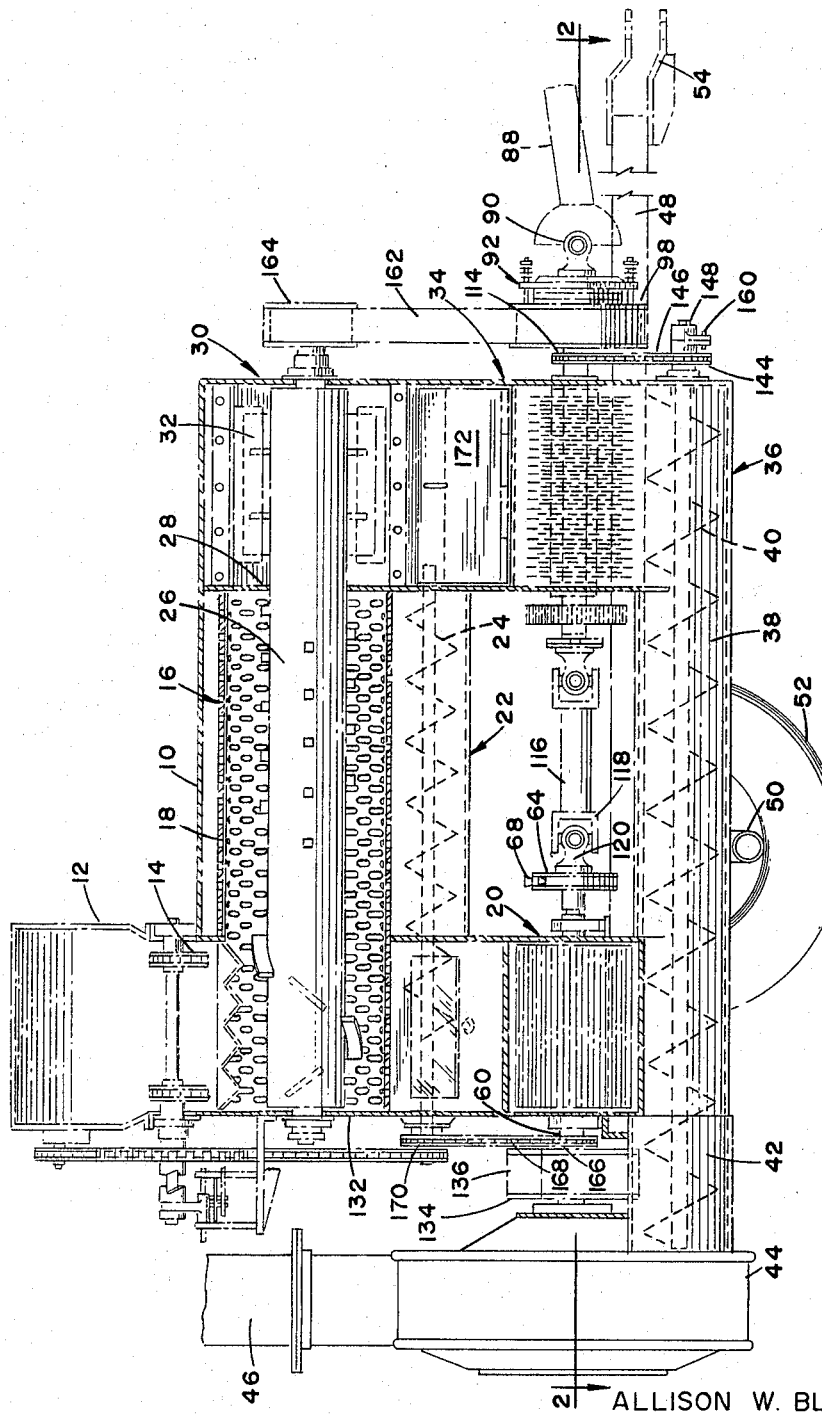
FIG. 1 is a vertical elevation of an exemplary corn processing machine embodying the principles of the present invention and being illustrated principally in longitudinally vertically sectioned manner, said machine also being illustrated as being of a mobile type.
Figure 2:
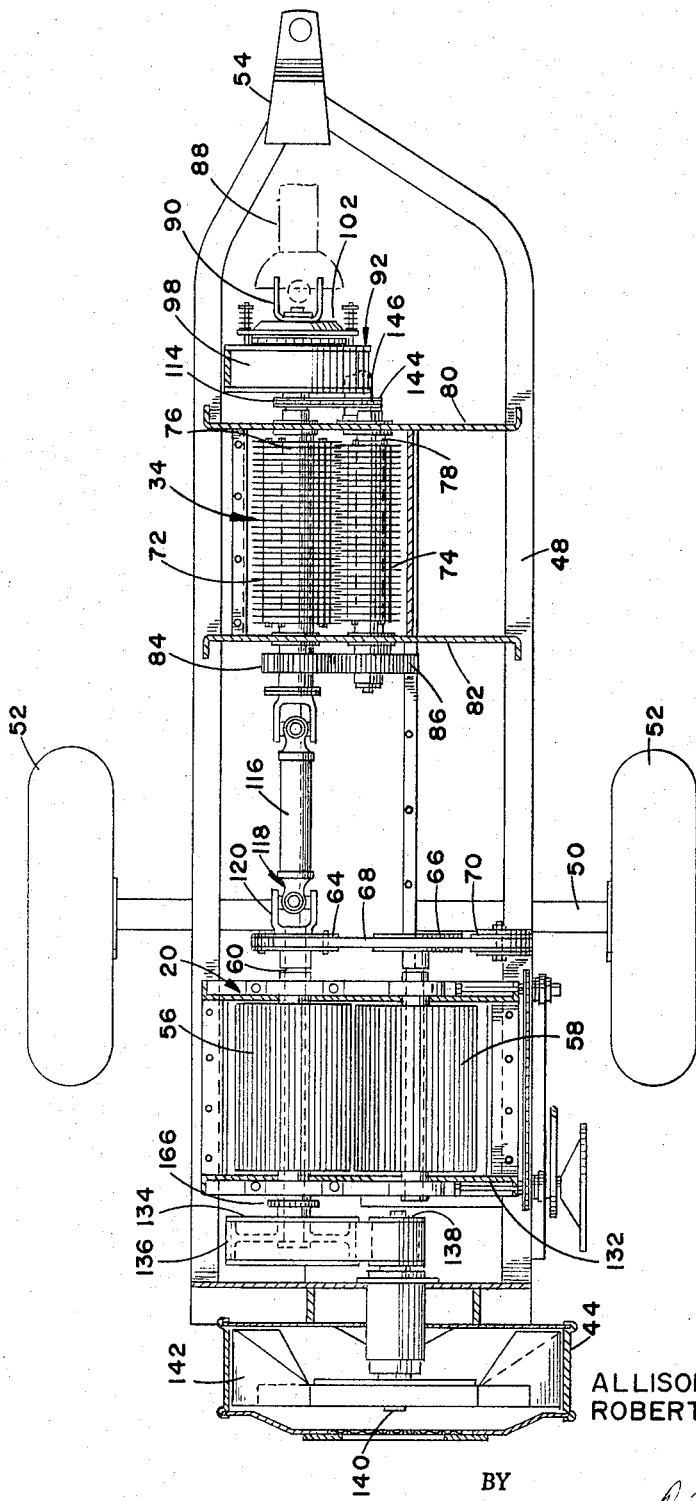
FIG. 2 is a horizontally sectioned plan view of the machine shown in FIG. 1 as viewed on the line 2—2 of said figure.

The corn processing machine illustrated primarily in FIGS. 1 and 2 comprises a housing 10 having entrance or inlet means 12 in the upper portion adjacent one end thereof for the reception of ears of corn which may be delivered by any suitable means such as an appropriate conveyor or elevator 14. Contained within housing 10 is a corn shelling means comprising shelling unit 16. Said unit consists of a perforated cylinder 18 through which the shelled kernels are discharged either directly to cracking means or unit 20 or into upper conveyor 22 which contains a rotary auger 24 by which the corn kernels are moved into the cracking unit 20.

Shelling of the corn kernels from the cobs is achieved by a rotary arbor 26 having appropriate radial projections thereon, certain of which are shaped for purposes of moving the bottom cobs progressively through entrance opening 28 between the cracking means 16 and the coarse cob chopping means 30. The arbor 26 also extends into the coarse chopping means 30 for purposes of operating the chopping members 32 carried by said arbor.

Immediately below the coarse chopping means is cob shredding means or unit 34 which receives the coarsely chopped cobs, by gravity, from the coarse chopping means 30 and proceeds to comminute or shred the coarse chopped cob pieces into relatively fine particles of desired size which are consumable by domestic animals such as cows, steers, and the like. A certain amount of nutrient value resides in the cob material. The same also provides desirable bulkage and roughage beneficial to the dietary welfare of such animals.

The shredded cob material is discharged from the shredding means 34 into one end of lower conveyor means 36 which comprises a generally tubular conduit 38 within which an auger 40 is rotatably mounted for purposes of effectively transmitting the shredded cob material toward the left, as viewed in FIG. 1, whereby the cracked kernels being discharged progressively from cracking means 20 are discharged into the shredded cob material being moved within the conveyor means 36 as the shredded material passes beneath the cracking means 20. This produces a substantially homogeneous product comprising a mixture of cracked corn kernels and at least a desired percentage of shredded cob material. Such mixture is introduced through discharge means 42 to a blower unit 44 within which the material is subjected to air currents which generally produce additional blending and mixing of the components of the material and discharge the same through a suitable exit conduit 46, for example, to any desired location or receiving means such as storage facilities, feed carts, or the like.

All of the above-described means and units preferably are supported upon a frame 48. Also, the entire machine preferably is of the mobile type, whereby frame 48 is connected to a transverse axle 50 and appropriate wheels 52 are rotatably mounted upon opposite ends of the axle. One end of frame 48 also has draft means 54 connected thereto for purposes of attaching the same to a draft vehicle such as a tractor or the like. For purposes to be described, it will be noted that the draft means 54 is laterally offset from the longitudinal central axis of frame 48, as readily can be determined from FIG. 2.

Also from FIG. 2, it will be noted that the cracking means 20 comprises a pair of cooperating cracking rollers 56 and 58, the peripheries of which are provided with appropriate relatively sharp ribs extending longitudinally of the rollers and the peripheries of the rollers being spaced appropriately to insure that kernels of corn passing between the rollers 56, which are driven to rotate toward each other at the top, are at least partially cracked so as to insure proper digestion thereof within the stomach of the animals which receive the same and thereby derive nutrient benefit therefrom.

The rollers 56 and 58 are mounted upon appropriate shafts 60 and 62 which are parallel to each other as can be seen from FIG. 2, and the opposite ends thereof are supported within suitable bearings shown in said figure, the shafts preferably projecting beyond the ends of said bearings. Accordingly, one end of shaft 60 has a pulley 64 connected thereto and the corresponding end of shaft 62 has another pulley 66 connected thereto. A flexible, endless drive belt 68 extends around pulley 64 and also around idler pulley 70, the upper course of belt 68 being straight between the upper peripheries of pulleys 64 and 70, while the lower course thereof extends upwardly and over the upper peripheral portion of driven pulley 66 connected to cracking roller 58, for purposes of causing the desired rotational directions for said rollers.

Regarding the cob shredding means 34, it will be seen from FIG. 2 that the same comprises a pair of cooperating shredding rollers 72 and 74 respectively supported upon appropriate shafts 76 and 78 which project at their opposite ends beyond the opposite ends of the shredding rollers and are supported within appropriate bearings formed in transverse sub-housing wall members 80 and 82. The rollers 72 and 74 preferably have a series of similar circular blades on each roller which have teeth on the peripheries thereof and the blades on the respective rollers interdigitate as can be seen from FIG. 2. To permit this, the blades are spaced apart in a longitudinal direction to provide appropriate limited spaces therebetween. Also, the diameter of shredding roll 74 preferably is less than that of shredding roll 72 as can be seen from FIG. 2.

Connected to the inner ends of the shafts 76 and 78 are drive gears 84 and 86 which intermesh to provide positive driving between the two shredding rollers for purposes of moving the upper circumferential portions thereof toward each other at the top, preferably at different speeds.

Inasmuch as the drive means for the processing machine comprises the principal part of the present invention, the most essential elements and details thereof now will be described. Referring particularly to FIGS. 1 and 2, it will be seen that, adjacent the right-hand end of each figure, an input drive shaft 88 is illustrated which comprises the principal drive shaft of the machine. The outer end thereof may be connected to any suitable source of power such as the P.T.O. of a tractor. By means of a universal joint 90, one end of drive shaft 88 is connected to a safety slip-type clutch 92, details of which are best shown in FIG. 3. The clutch 92 preferably provides a friction type drive member 94 which engages a driven pressure member 102 and driven member 96 and also comprises a pulley 98, for purposes to be described.

The friction drive member 94 preferably has friction discs 100 respectively uopn opposite sides thereof, these being flat and annular. The friction faces 100 respectively are engaged by the outer face of driven member 96 of the clutch and a pressure plate 102 of the clutch. The pressure plate 102 is supported by a series of circumferentially spaced clamping bolts 104 around which compression springs 106 are mounted for engagement with outer surface portions of the pressure plate 102.

The bolts 104 preferably are threaded into suitable holes in driven member 96 of the clutch 92 and appropriate sleeves 108 are positioned upon the shanks of the bolts and extend between the outer face of member 96 and washers 110 beneath the heads of bolts 104 for purposes of limiting the threaded engagement of the bolts 104 with the driven member 96. Springs 106 are movable in opposite expanding and contracting directions upon the sleeves 108, the length and tension of the springs being sufficient to afford adequate frictional driving engagement between the drive member 94 of the clutch and driven member 96 thereof.

The shaft 76 of shredding roller 72, as also seen from FIG. 3, is relatively long and supports the driven member 96 which includes the pulley 98. Said shaft is supported within a suitable anti-friction bearing 112 carried by sub-housing member 89. Preferably mounted upon and fixed to the hub of pulley 98 is a driving sprocket gear 114. For purposes of further description hereinafter, shredding roller 72 is designated as the driving roller of the shredding means 34.

Also as seen from FIG. 3, the opposite end of shaft 76 from that which supports pulley 98 is connected to one end of connecting drive shaft 116, which also is shown in FIGS. 1 and 2. From these latter figures, it also will be seen that the connecting drive shaft 116 is in longitudinal alignment with driving roller 72 and drive shaft 88. The opposite end of connecting drive shaft 116 is connected to another universal joint 118, of which the clevis 120 is connected to a spider or flange 124 through which circumferentially spaced shear bolts 126 extend and correspondingly extend through complementary holes within the pulley 64. Appropriate lining means shown in exemplary manner in FIG. 3 may be included within the aligned holes with the spider or flange 124 and the pulley 64. Further, it will be seen that the shear bolts 126 are so positioned that they are subject to shearing rupture in either direction of rotation of the mechanisms between which it is connected.

As described hereinabove, the pulley 64 is mounted upon shaft 60 of one of the cracking rollers 56 which is designated as the driving cracking roller. The end of shaft 60 to which the pulley 64 is connected is supported by an appropriate anti-friction bearing 128 formed in another sub-housing wall member 130. Referring to FIG. 1 and especially FIG. 2, it will be seen that the shaft 60 which supports driving cracking roller 56 extends through an appropriate bearing supported by the left-hand end wall 132 of housing 10 to permit another driving pulley 134 to be fixed thereto. A suitable friction belt 136 extends around driving pulley 134 and driven pulley 138 which is mounted upon the inner end of shaft 140 of fan 142 within the blower unit 44 as shown in detail in FIG. 2.

From the foregoing principal features described in detail above, it will be seen that the drive means especially for the shredding means 34, cracking means 20, and blower unit 44 are all in substantial longitudinal in-line axial alignment or arrangement with each other as well as being in direct axial alignment with and connected to the main drive shaft 88. Said axis is laterally spaced to one side of the central longitudinal axis of frame 48 as can best be seen from FIG. 2. In order that the main drive shaft 88 may not normally be subjected to an undue amount of angular disposition with respect to the general longitudinal axis of the drive means referred to hereinabove, and in order that the drive shaft 88 may be connected to a P.T.O. of a tractor which usually is substantially in vertical alignment with the draft means on the tractor, it will be seen from FIG. 2 that the draft means 54 on the frame 58 is disposed in an offset manner with respect to the central longitudinal axis of frame 48. This arrangement will dispose said draft means substantially in axial alignment with the longitudinal axis of all of the interconnected drive means referred to above, thereby providing maximum efficiency for the operation of said drive means.

For purposes of actuating the auger 40 of lower conveyor means 36, the shaft of the auger is provided, adjacent the right-hand end thereof, as viewed in FIGS. 1 and 2, with a sprocket gear 144 which is transversely aligned with the driving sprocket gear 114 mounted upon the hub of driving pulley 98 as shown in FIG. 3. Extending around sprocket gears 114 and 144 is a sprocket chain 146, whereby the auger 40 is positively driven by the slip-type safety clutch 92 through the medium of said sprocket gears and chain just described, the direction of rotation being such as to advance the shredded cob material toward the discharge means 42 therefor as shown in FIG. 1.

Due particularly to the positive nature of such drive means, attention is directed particularly to FIGS. 1 and 4 wherein it will be seen that shaft 148 of auger 40 has a collar 150 fixedly connected thereto such as by a transverse pin 152, the collar 150 having a radially extending lug 154 thereon. The sprocket gear 144 also has a hub 156 integral therewith, said hub having a radially extending lug 158 thereon. The lugs 154 and 158 have similar holes extending therethrough in alignment with each other for reception of a shear bolt 160 therethrough whereby in the event conveyor means 36 becomes jammed or overloaded beyond the shearing strength of shear bolt 160, the latter will be ruptured and thereby prevent damage to the conveyor means.

From FIG. 1 in particular, it will be seen that the longitudinal, axially extending in-line drive means comprising the driving rollers of the cracking means 20 and shredding means 34, connecting drive shaft 116 and main drive shaft 88, provides the principal source of driving force for the entire processing machine. The manner in which the fan 142 of the blower unit 44 is driven is described hereinabove. In addition, from FIG. 1, it will be seen that by means of a belt 162, which extends around pulley 98, also extends around driven pulley 164 affixed to one projecting end of arbor 26. Said arbor is rotatable within the shelling means 16 and coarse chopping means 30. In addition, another driving sprocket gear 166 is mounted on the left-hand end of driving shaft 60 of cracking means 20, as shown in FIG. 2, for purposes of driving a sprocket chain 168, see FIG. 1 which extends around a driven sprocket 170 that is fixed to the outer end of the shaft of auger 24 within upper conveyor 22. Additional drive means for the elements of the conveyor within the elevator 14 also are illustrated generally in FIG. 1 but such drive means do not necessarily comprise part of the instant invention.

In accordance with the underlying operating principles of the present invention and especially the drive means described hereinabove in the foregoing specification and illustrated in the drawings comprising a part thereof, it will be seen that, for example, if any of the processing means or units of the entire processing machine become overloaded or jammed, the above-described safety means incorporated within the drive means will operate to prevent any substantial damage to any portion of said processing means. For example, if the shelling means 116 becomes overloaded and jammed, it will retard operation of auger 24 and cause the clutch 92 to slip. If such overload occurs suddenly, whereby there is substantial momentum in the other operating means such as the cracking means 20, such momentum which would tend to continue to operate the axially aligned drive means, including drive shaft 116 for example, would rupture shear bolts 126 if of sufficient force.

In the event either the coarse chopping means 30 or the finer shredding means 34 should become overloaded or jammed, similar slippage of the clutch 92 would be caused without stopping the operation of drive shaft 88 and in the event the momentum of, for example, the cracking means 20 or the upper conveyor 22 is such that it would tend to induce driving movement to continue, shear bolts 126 similarly would be ruptured as described hereinabove and thereby protect the related chopping and shredding means for the cob.

More specifically, as is not uncommon in the operation of agricultural equipment, a stray piece of iron, very hard wood, or even a stone occasionally will be introduced along with ears of corn to the entrance 12 of the processing apparatus and the same conceivably could pass through the shelling means 16 and coarse chopping means 30, for reception by the shredding means 34. Obviously, if of a sufficiently hard and obstructing nature, the same would become lodged between the teeth of the disc members upon the rollers of the shredding means 34 and instantly lock the same. This would impose a very sudden shock upon the drive means, causing the clutch 92 instantly to slip and obviously under such circumstances, the momentum within certain remaining means and units of the apparatus, such as cracking means 20 and the upper conveyor 22 would tend to cause these means or units to continue to operate. Under such circumstances, the shear bolts 126 would rupture instantly and permit the residual momentum of said aforementioned cracking and conveyor means to continue to operate until the momentum was dissipated. Meanwhile, the power to drive shaft 88 could be disconnected by normal clutch means on the tractor, for example, and by limited backing off of the rollers of the shredding means 34, the objectionable foreign material could be removed, particularly through an opening normally closed by a door 172, shown in FIG. 1 for example, and power then could be restored to the principal drive shaft 88.

As has been described hereinabove, in the event the lower, principal conveyor means 36 should become clogged or jammed, no damage would be sustained because under such circumstances, the safety means comprising shear bolt 160 would be ruptured and operation of auger 40 would immediately cease. Accordingly, the foregoing description is intended to recite only certain principal sources of disruption of operation of the machine and corresponding functions of the safety provisions of the drive means, such description not being intended to be exhaustive but merely exemplary to portray the relatively simple but highly effective safety provisions incorporated in such drive means for purposes of minimizing damage and corresponding expense incurred in normal operations of the processing machine by the drive means comprising the principal features of the present invention.

While the invention has been described and illustrated in its several preferred embodiments, it should be understood that the invention is not to be limited to the precise details herein illustrated and described since the same may be carried out in other ways falling within the scope of the invention as claimed.

Having thus described our invention, what we claim is:

1. A corn processing machine to prepare ears of corn for livestock feeding comprising corn shelling means operable to receive ears of corn and shell the kernels of corn from the cobs, means to separate said shelled kernels from the cobs, corn cracking means arranged to receive said shelled corn kernels and crack the same a minimum amount, chopping and shredding means operable to chop and shred said cobs into a predetermined shredded size, and conveyor means operable to receive said shredded cob material and mix it with said cracked corn kernels to produce a substantially homogeneous mass, in combination with substantially in-line drive mechanism for said aforementioned means in said processing machine comprising a drive shaft adjacent one end of said machine connectable to a source of power, a slip-type clutch connected between said shaft and said shredding means, a connecting drive shaft extending from said shredding means axially toward said cracking means, and a shear bolt safety connection between said connecting shaft and cracking means, whereby accidental jamming of said shredding mechanism causes said clutch to slip and said connecting shaft to stop or decrease in speed while momentum of said cracking means may sever said shear bolt safety connection and thereby prevent damage to said shredding means.

2. The corn processing machine according to claim 1 in which said slip-type clutch comprises frictionally coengageable driving and driven members and said conveyor means comprises a conduit extending longitudinally of the machine and having an auger rotatable therein, said processing machine further including drive connection means between the driven member of said slip-type clutch and said auger of said conveyor means, said drive connection including shear-type safety means operable to disrupt the operation of said conveyor means upon an overload or jamming occurring therein.

3. The corn processing machine according to claim 1 in which said shredding means comprises two cooperating shredding rollers and said cracking means comprises two cooperating cracking rollers, said machine further including drive connections respectively extending transversely between each of said pairs of rollers of said shredding and cracking means, one roller of each pair of said means comprising a driving roller and said driving roller of each pair in said means and said drive shaft and connecting drive shaft all being substantially in longitudinal alignment with each other, said alignment being substantially parallel to the longitudinal axis of said machine.

4. The corn processing machine according to claim 3 in which said machine further includes a frame supporting all of said processing means of said machine, wheels mounted upon said frame to render the machine mobile, and draft means at one end of said frame to permit attachment to a draft vehicle, said rollers of said shredding and cracking means respectively being in substantially side-by-side relationship and said shredding and cracking means being positioned substantially centrally of said frame, whereby the axis of said axially aligned driving rollers of said shredding and cracking means and said drive shaft and connecting drive shaft are laterally offset from the longitudinal central axis of said frame, said draft means of said frame similarly being offset and aligned substantially with said offset axis of said driving rollers.

5. The corn processing machine according to claim 3 in which said drive connection between the shredding rollers of the shredding means comprises a sprocket chain extending around sprocket gears respectively interconnected to said shredding rollers, and the drive connection between the cracking rollers of said cracking means comprises a flexible endless friction belt extending around pulleys respectively interconnected to said cracking rollers, said shear-bolt safety connection between said connecting drive shaft and cracking means engaging the pulley interconnected to the driving cracking roller of said cracking means.

References Cited
UNITED STATES PATENTS

| | | | |
|---|---|---|---|
| 766,699 | 8/1904 | Jorgensen. | |
| 1,019,828 | 3/1912 | O'Bryan | 146—71 |
| 1,530,095 | 3/1925 | Sharp | 146—79 X |
| 3,348,780 | 10/1967 | Barkstrom et al. | 241—101 |

W. GRAYDON ABERCROMBIE, *Primary Examiner.*